US009356940B2

(12) United States Patent
Hanna, Jr. et al.

(10) Patent No.: US 9,356,940 B2
(45) Date of Patent: *May 31, 2016

(54) SECURITY AND ACCESS SYSTEM BASED ON MULTI-DIMENSIONAL LOCATION CHARACTERISTICS

(71) Applicant: Digital Authentication Technologies, Inc., Boca Raton, FL (US)

(72) Inventors: David A. Hanna, Jr., Bel Air, MD (US); Roger R. Dube, Pittsford, NY (US)

(73) Assignee: Digital Authentication Technologies, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,841

(22) Filed: May 19, 2014

(65) Prior Publication Data

US 2014/0337921 A1 Nov. 13, 2014

Related U.S. Application Data

(63) Continuation-in-part of application No. 13/897,384, filed on May 18, 2013, which is a continuation-in-part of application No. 12/469,393, filed on May 20, 2009, now Pat. No. 8,453,005, which is a continuation of application No. 10/987,553, filed on Nov. 13, 2004, now Pat. No. 7,551,739.

(60) Provisional application No. 61/824,972, filed on May 17, 2013, provisional application No. 60/520,094, filed on Nov. 13, 2003.

(51) Int. Cl.
*H04L 29/06* (2006.01)
*H04L 29/08* (2006.01)
*H04W 12/06* (2009.01)
*G01S 5/02* (2010.01)
*H04W 4/02* (2009.01)

(Continued)

(52) U.S. Cl.
CPC .............. *H04L 63/107* (2013.01); *G01S 5/0252* (2013.01); *H04L 63/0428* (2013.01); *H04L 63/08* (2013.01); *H04L 67/18* (2013.01); *H04W 12/06* (2013.01); *H04W 4/02* (2013.01); *H04W 4/023* (2013.01); *H04W 12/04* (2013.01); *H04W 12/10* (2013.01)

(58) Field of Classification Search
CPC .... G01S 5/0252; G01S 5/0232; H04W 12/04; H04W 12/10; H04W 4/02; H04W 12/06; H04W 4/023; H04L 63/08; H04L 63/107; H04L 67/18; H04L 63/0428
See application file for complete search history.

(56) References Cited

U.S. PATENT DOCUMENTS 5,323,322 A * 6/1994 Mueller et al. ................ 701/471
5,757,916 A * 5/1998 MacDoran et al. ........... 380/258

(Continued)

*Primary Examiner* — Jung Kim
*Assistant Examiner* — James J Wilcox
(74) *Attorney, Agent, or Firm* — Patent Venture Group; Joe A. Brock, II

(57) ABSTRACT

An invention is provided for system security and access based on multi-dimensional location characteristics. The invention includes collecting contextual information characterizing a specific location during a first time period utilizing a contextual data collection device (CDCD), wherein the contextual information indicates specific characteristics of the location and is collected at the location. Then, a contextual location fingerprint (CLF) is created based on the collected contextual information. In general, the CLF is a data space of values mapped over specific period of time. In operation, new contextual information is collected at a location occupied by a device to be verified during a second time period. The new contextual information then is compared to the CLF and authenticating the device fir the new contextual information is within predefined parameters of the CLF.

12 Claims, 5 Drawing Sheets

(51) Int. Cl.
*H04W 12/04* (2009.01)
*H04W 12/10* (2009.01)

(56) References Cited

U.S. PATENT DOCUMENTS

| | | | |
|---|---|---|---|
| 6,269,246 B1* | 7/2001 | Rao et al. | 455/456.3 |
| 2003/0126197 A1* | 7/2003 | Black et al. | 709/203 |
| 2005/0040968 A1* | 2/2005 | Damarla | H04W 64/00 340/5.53 |
| 2006/0136717 A1* | 6/2006 | Buer et al. | 713/155 |
| 2012/0105202 A1* | 5/2012 | Gits | G01C 21/206 340/8.1 |
| 2012/0169542 A1* | 7/2012 | Mathews et al. | 342/450 |
| 2014/0128099 A1* | 5/2014 | Ledlie | G01S 5/0252 455/456.1 |
| 2014/0161257 A1* | 6/2014 | Dube | G01S 19/14 380/258 |
| 2014/0171118 A1* | 6/2014 | Marti | G01S 5/0252 455/456.3 |
| 2014/0194143 A1* | 7/2014 | Krainz | G01S 5/0252 455/456.1 |

\* cited by examiner

SECURITY AND ACCESS SYSTEM BASED ON MULTI-DIMENSIONAL LOCATION CHARACTERISTICS

CROSS REFERENCE TO RELATED APPLICATIONS

This application claims the benefit of U.S. Provisional Patent Application having Ser. No. 61/824,972, filed on May 17, 2013, and entitled "A Security and Access System Based On Multi-Dimensional Location Characteristics," which is hereby incorporated by reference. This application is a continuation-in-part of U.S. patent application Ser. No. 13/897,384, filed May 18, 2013, entitled "Location-Specific Security and Access System Based On Radio Frequency Signal Attenuation," which is a continuation-in-part of U.S. patent application Ser. No. 12/469,393, filed May 20, 2009 now U.S. Pat. No. 8,453,005, entitled "System and Method for Container Monitoring, Real Time Authentication, Anomaly Detection, and Alerts," which is a continuation of U.S. patent application Ser. No. 10/987,553, filed Nov. 13, 2004 now U.S. Pat. No. 7,551,739, entitled "Method For Container Monitoring, Real Time Authentication, Anomaly Detection And Alerts," which claims the benefit of U.S. Provisional Patent Application having Ser. No. 60/520,094, filed on Nov. 13, 2003, and entitled "Method for Container Monitoring, Real Time Authentication, Anomaly Detection and Alerts," wherein all of the U.S. priority applications are hereby incorporated by reference.

BACKGROUND OF THE INVENTION

1. Field of the Invention

This invention relates generally to authentication of a remote electronic device, and more specifically, to a method and apparatus for authenticating via information specific to the device's physical location within a structure.

2. Description of the Related Art

Data Center Security Services (DCSS), often used in conjunction with cloud computing frameworks, enables organizations to add location and proximity verification to a multifactor trust chain, strengthening and simplifying security from any protocol, system, technology or location. Geo-location, signal triangulation, and IP address lookup have all been used in some fashion to enable location-based policy decisions.

While these technologies continue to have application in areas such as enforcement of access rules to licensed content or low-level system security controls, the limitations and vulnerabilities in these technologies make them a less than ideal choice in protecting areas such as data centers, critical infrastructure and other highly sensitive information and services. However, these location technologies have serious limitations, such as: being subject to spoofing, limited ability to operate within buildings, and a high degree of error.

Security and privacy concerns on unrestricted workload migration, and the guarantee of the individual workloads' segregation within a trusted compute pool, are major concerns in today's cloud computing framework. The fear of workloads leakage or interference in a shared cloud computing environment is even more pronounced when the trusted compute pool is distributed across countries with different judicial, regulations, and data security and privacy laws.

Therefore, the launch, execution and later movement of workloads from cloud servers as a function of the government or corporate policies may need to be restricted based on the servers' pool geolocation. A common practice is to only use cloud servers that are physically located within the same trusted pool and the same country, taking advantage of the trusted pools of compute and, if possible, the same data center.

The use of such public and private networks has fundamentally altered the manner in which business enterprises and government agencies communicate and conduct business. For example, the Internet, intranets and extranets are used to store, analyze and transmit information between and within organizations, and permit interactive, local, national or global communication on a real-time basis. Moreover, these networks are now used for electronic business-to-customer retail commerce and for electronic business-to-business commerce of all types.

In order to achieve its full potential, however, e commerce must overcome numerous security and related issues, including concerns relating to hacker attacks, merchant impersonation, data confidentiality and integrity, fraud, and transaction repudiation. Key to all of these problems is the need to authenticate a user's identity in a manner that is extremely difficult or impossible to defeat.

For example, to improve the confidentiality of communications and commerce over networks, public key infrastructure ("PKI") encryption systems have been developed. Using PKI encryption, digital messages are encrypted and decrypted using ciphers or keys. A conventional public and private key pair includes a public key and a private key. Each user of the system has a public key and a private key and must know the public key of the intended recipients of its messages. In general, a message is encrypted and sent by a sender using the recipient's public key and is then received and decoded by the recipient using his private key.

For example two network computer users, Alice and Bob, each have their own public and private key pair. The private keys are secret numbers to which only the owner has access. In general each public is generated using the following formula:

$$Gx \bmod P, \qquad (1)$$

where G and P are large prime numbers and x is the user's private key. In this manner, eavesdroppers would have great difficulty determining x even if the values of G and P are known. Hence, the public keys can be broadly disseminated without revealing the related private key. For example, Bob and Alice provide their public keys to each other prior to initiation of encrypted communication.

Thereafter, whenever encrypted communication is to occur, the sender utilizes their private key in conjunction with the recipient's public key to encrypt the data being sent. Upon receipt, the recipient decrypts the data using the recipient's private key. For example, when Alice wishes to send Bob an encrypted message, Alice encrypts the message using her private key in conjunction with Bob's public key. Upon receipt, Bob decrypts the message using his private key.

PKI systems attempt to provide a high level of security and confidentiality because messages can be decoded only by persons having the recipient's private key. However, it is well known in the industry that a weakness of PKI technology is its susceptibility to the "man-in-the-middle" attack.

For example, assume a new person, Cindy, enters the example as a middleman. As before, Alice has a public and private key pair and Bob has a public and private key pair. In addition, Cindy, the middleman, has a public and private key pair. If Cindy can intercept a transmission between Bob and Alice, she can trick them into using her public key. In this attack, the attacker intercepts the transmission of a public key and replaces it with the attacker's false key, thereby effectively replacing the true sender as the trusted party. This enables the attacker to send, receive and decode messages intended for the original legitimate user.

For example, during a "man-in-the-middle" attack, Cindy intercepts Alice's public key and replaces it with Cindy's public key. Similarly, Cindy intercepts Bob's public key and replaces it with Cindy's public key. Bob and Alice each believe they have each other's public key, however, they actually have Cindy's public key. Later, during encrypted transmissions, both Alice and Bob unknowingly use Cindy's public key in conjunction with their respective private keys to encrypt messages to each other, which are actually intercepted by Cindy. Cindy can decrypt the messages using her private key, and further, re-encrypt the messages using Cindy's private key and the proper recipient's public key.

Alternatively, an attacker can also submit false public key entries to certificate managers and effectively masquerade as another person. The implementation and use of PKI technology over remote sites without independent verification of identity poses many risks and must be used judiciously.

As described above, PKI encryption systems do not provide assurance as to the authenticity of the sender. An attempt has been made to address this problem through use of digital certification systems that use public and private keys to create special files, or digital certificates or signatures. The digital certificates are encoded using a sender's private key and, upon receipt, decoded by the recipient using a copy of the sender's public key obtained from a remote trusted administrator. For example, a certification authority (CA), which confirms the identity of the sender through transmissions over the Internet or other network, can be used to disseminate public keys.

Certifying authorities generally are either public or private. Public certifying authorities are independent third parties that issue digital certificates for use in Internet applications, after conducting due diligence as to the identity of the subscriber. Private certifying authorities are entities that issue their own digital certificates, often to closed communities of users, such as customers or employees, for use in Internet, intranet, extranet or other applications.

However, the Certifying Authority approach has numerous flaws and loopholes. For example, it is well known in the PKI industry that a person can create a key pair and claim to be someone else. By inserting an unauthorized public key in a transaction or on a public database, the masquerading party creates ambiguity and can receive encrypted files intended for the person he is impersonating. This flaw, combined with a lack of location and apparatus ID information, makes detection of the identity deception extremely difficult.

Remote certifying authority technologies are fundamentally self-limiting. As explained above, remote certifying authorities use multiple transmissions over the Internet to receive, certify, and then deliver digital certificates. There are at least three Internet transmissions of information for each digital certificate created, including the original request for a certificate, the delivery of a certificate to the initiator, and the transmission of the original document and certificate to the final intended recipient. Moreover, should the recipient want to certify his receipt, three additional transmissions must occur. As more users rely upon remote certifying authorities for digital certificates, the demand for Internet bandwidth will increase geometrically, ultimately slowing the system down. The more the system is used, the slower it will become, causing users to turn away from CA technology. Due to this self-limiting property, it is unlikely that remote certifying authority technologies will ever become the universal standard for identity authentication.

Moreover, revocation of privileges and identity authentication are not immediate using CA technology. Since libraries of public keys are storied in multiple databases that reside on the servers of multiple Certifying Authorities, a significant delay exists between the time that a service elects to revoke key privileges and the time that the revocation information has fully propagated to all possible public key databases and servers. More and more large organizations are recognizing that the maintenance of current information about authorized and unauthorized personnel across multiple remote CA's is a daunting task, which is further complicated by the fact that a person whose credentials have been revoked may continue to have access privileges until the revocation propagation is complete. This raises security concerns about sensitive data being exposed to dismissed or disgruntled employees whose credentials have been revoked. In the today's CA system, those employees have measurable time in which they may continue to access sensitive information against the will of their employer.

Commercial applications have a need for a verifiable means to demonstrate the occurrence of a particular e-commerce transaction or Internet communication, in order to reduce the risk of fraud or repudiation of a transaction or communication by the parties. This need is present in the case of existing e-commerce applications, and will increase as e-commerce expands with the offering of additional software packages over the Internet through application service providers (ASPs) and the offering of additional material that is copyright protected (e.g., CD quality sound, video and images.)

A key to continuing e-commerce growth is an incontestable witness to a connection, download, file-creation or transmission that will create security of audit trails and transaction records. The common elements required to solve these problems include time and authenticated user location. Although it is necessary to record file activity on the receiving computer system, non-repudiation of a transaction requires recordation of the same file activity on the sender's computer system as well. Independent witnessing of time and location of events provides this non-repudiation.

Existing Remote Certifying Authorities attempt to identify both a specific document and the signer of the document, but these technologies cannot identify the exact time when a document or signature was created (as distinguished from when a document is received) because the time in a computer can be altered. Moreover, remote certification with a CA over the Internet or other network requires delay and transmission time, thereby preventing exact time confirmation. Existing attempts to deal with the problem of real-time verification are not effective because assurance is given only as to the time of document receipt, not creation.

A number of attempts have been made to increase system security in the prior art. The following is a list of prior art disclosures that provide some form of system security. However, as will be seen, none of the disclosures provides a level of security currently needed to ensure proper protection of today's highly sensitive transaction data.

Hissle et. al, in PCT publication WO 97009802, describe a method which the timestamp for a document is authenticated using a remote source of time such as GPS. Since the GPS satellite system has an independent and redundant source of time and date, the remote time can be compared to the local system time as a means of authenticating the system time and therefore the time of creation of a document. The external and local times are then compared and if the difference exceeds a preset range, the internal clock is updated. The disclosure further describes the creation of a digital timestamp or signature in which the authenticated time is combined with a summary of the file and the processor ID to provide authentication of the file's creation time. The concern here is that the system does not include the location of the file at its time of creation nor the identity of the user.

Murphy, in U.S. Pat. No. 5,640,452, discloses a method in which the location of a decryption chip is employed to restrict access to a broadcast signal. The location is determined locally by a GPS receiver and is compared against the authorized location set at the time of installation. For example, a digital satellite receiver dish could employ this technology to assure that clones of the decryption chip will not operate at any location other than that originally licensed, since their location will be incorrect. This technology does not authenticate the user in any way, nor does it authenticate the GPS location through any independent means. It further suffers from the fact that since the location detector sends an enabling signal to the decryption chip, the system will likely be defeated by insertion of the proper enabling signal, thereby bypassing the location requirement.

Loomis et. al., in U.S. Pat. No. 6,092,193, disclose a method for authenticating accumulated instrument data in which a summary of the data sampled at pre-set times are compiled in a sequential fashion and encrypted each time the total exceeds a pre-set value. By comparing the decrypted totals to the current total of the data in memory, alterations to the data can be detected and therefore declared invalid. The disclosure does not employ location, nor does it authenticate the user in any way in order to control access.

Schipper et. al., in U.S. Pat. No. 5,754,657, describe a process by which a message source is authenticated by its location. In this patent, the inventors employ a process by which the source of the message receives its location using GPS and appends a portion of that raw signal to the data. Part or all of the combined message can be encrypted. The signal is decrypted upon receipt, and the receiver uses the raw GPS signals to determine whether or not the source resides at its pre-authorized location. Unfortunately, a synthesized or pre-recorded GPS signal stream could be employed to facilitate masquerading by an unauthorized source.

In U.S. Pat. No. 5,757,916, MacDoran et. al. disclose a technique by which the raw satellite signals from a source computer are transmitted to a remote server that requires authentication. The MacDoran disclosure further employs a second source computer that also sends its raw GPS signals to the server. The server uses the raw signals from both sources to calculate their respective locations, which are compared against locations stored in the profiles for the two sources. In addition, a differential location vector is calculated from the raw signals, and this differential vector is also compared against the profiles to determine that it is consistent with the two authorized locations. In principle, since the satellites are continually moving and the calculations are performed on signals from two nearby locations, spoofing of the original source signal would be difficult. This system introduces the additional complication that an authenticated third party (the second source) must be on-line, receiving signals, and available for transmission in order to authenticate the first source. Availability of authentication and privacy of the two sources are concerns that surface here.

In view of the foregoing, there exists a need for enhanced authentication of the identity of a person initiating an electronic transaction, electronic file, document, or accessing an electronic file, document, or database. In order to avoid opportunities for interception, masquerading, "man-in-the-middle" attacks, and other forms of electronic fraud, there is also a need that such authentication not require any transmission of information to a remote third party, commonly referred to as "remote certifying authorities." Furthermore, such authentication should preferably occur on a real-time basis, at the time of the transaction, file creation, or data access. Moreover, such authentication should preferably include location information that can be independently certified.

SUMMARY OF THE INVENTION

Broadly speaking, embodiments of the present invention address these needs by providing a security and access system based on multi-dimensional location characteristics. In general, embodiments of the present invention authenticate the presence of a device (such as a laptop or computer server) through the creation of a Contextual Location Fingerprint (CLF) comprising location specific contextual information. In one embodiment, a method is disclosed for providing system security and access based on multi-dimensional location characteristics. The method includes collecting contextual information characterizing a specific location during a first time period utilizing a contextual data collection device (CDCD), wherein the contextual information indicates specific characteristics of the location and is collected at the location. Then, a contextual location fingerprint (CLF) is created based on the collected contextual information. In general, the CLF is a data space of values mapped over specific period of time. In operation, new contextual information is collected at a location occupied by a device to be verified during a second time period. The new contextual information then is compared to the CLF and authenticating the device when the new contextual information is within predefined parameters of the CLF.

In one embodiment, a portion of the contextual information includes RF measurement data acquired using dual frequency measurements of dielectric content of intervening material. As mentioned above, the contextual information can be mapped over time to create the CLF, which is a data space of values mapped over specific period of time. During authentication, a token can be established, such as a private session key. In this embodiment, the token can be provided to other servers within a predefined proximity of a location hub server.

In general, the contextual information can include physics-based values, which are incalculable and non-spoofable. Hence, only someone at the specific space will be to produce the same contextual information data for authentication purposes. Moreover, embodiments of the present invention advantageously do not utilize actual information about the geo-location of the specific space or the client device for authentication. As can be appreciated, false GPS signals can be sent to a GPS receiver that provide the receiver with false information about its current location using either spoofed signals or by employing a GPS signal generator. As a result, using actual GPS geo-location data is not a secure method to establish the location of a client device. Moreover, transmitting specific GPS coordinates for a geo-location creates a security concern that an eavesdropper monitoring a wide area network, such as the Internet, can obtain sensitive information about the user's geo-location. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
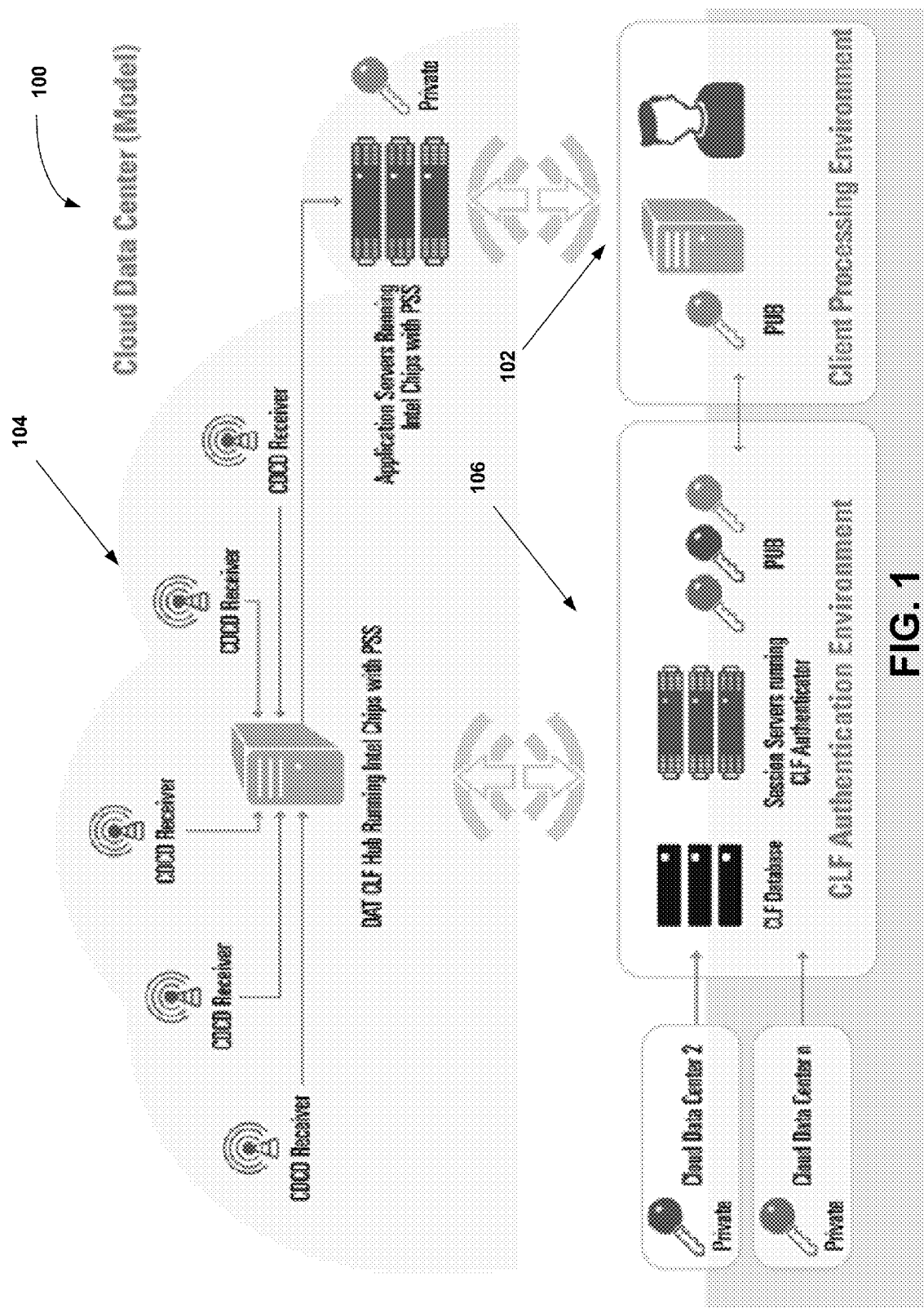
FIG. 1 is an illustration showing a Data Center Security Services (DCSS) master solution system, in accordance with an embodiment of the present invention.

An invention is disclosed for a security and access system based on multi-dimensional location characteristics. In general, embodiments of the present invention authenticate the presence of a device (such as a laptop or computer server) through the creation of a Contextual Location Fingerprint (CLF) comprising location specific contextual information. Contextual information is defined as information which can be obtained through electronic means such as line-of-site range information, acoustic reflection, radio frequency (RF) measurements and any other type of information which can only be determined at the location in question.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Contextual Location Fingerprints (CLFs) represent the superset of data obtained from Contextual Data Collection Devices (CDCDs). CDCDs are the actual devices which can obtain any type of information related to a location. Embodiments of the invention use information obtained from the CDCDs at different time intervals to validate, with a high degree of confidence, that the CDCDs are still operating in the same location. This confidence match can then be used as the basis for a location authentication challenge/response protocol.

As such, embodiments of the present invention provide a mechanism for establishing that a device is in the same location at two distinct and separate times. By establishing this fact, the device can take part in a security protocol which includes location verification as one of the authentication factors.

Contextual information collected from electronic devices is utilized to establish a unique signature for that location which is called the Contextual Location Fingerprint. As mentioned previously, Contextual information is defined as information which can only be obtained from that location. Examples of contextual information include, for example: 1) 3-D environment mapping from a single perspective, 2) Light and Sound reflective characteristics of surrounding materials, and 3) Birefringence characteristics.

Contextual information obtained in the same fashion from the same location at some later time can be statistically compared to the original CLF to establish a statistical confidence that the measurements were taken from the same location.

Contextual Data Collection Devices (CDCDs) can comprise any device capable of collecting desired contextual information, and more than one CDCD can be utilized to collect contextual information forming a particular Contextual Digital Fingerprint (CDF). That is, the CDCDs are used to establish a Contextual Digital Fingerprint (CDF) for a location based on the observable characteristics of that location. Examples of contextual information include: 1) Range information to key materials, such as doors, walls, ceilings, fixed appliances, ductwork, etc., 2) Range and intensity of measurable sources of energy, such as infrared beacons, sound reflection characteristics, etc, and 3) Birefringence measurements from established sources of RF.

Different types of CDCDs can exist and their utilization will depend on the operating characteristics of the location being secured. For example, a CDCD can function via technology known as Location Specific Digital Fingerprint (LSDF), as described in U.S. Pat. No. 7,177,426 to Dube, which is incorporated herein by reference. More than one type of CDCD may be employed to create a CDF as described in U.S. Pat. No. 8,533,793 to Hanna, which is incorporated herein by reference.

In the event of planned environment changes, e.g. building reconstruction, embodiments of the present invention provide operators with the ability to temporarily disable the CDF components of the multi-factor authentication system or to only rely on information from certain CDCDs. Once the environment changes are complete, operators will be able to remotely establish the CDF or initialize the new CDF in person.

In one embodiment, a system is disclosed for establishing one-way or bidirectional trust that the end-point hardware involved in network traffic exchanges are operating from the locations in which they were installed. This system can include a host server system that serves as an authentication server. This system has authentication means for generating challenges that are transmitted to the user system, and is capable of receiving the responses of the user system. The system also compares one or more attributes of the user response in order to determine whether these match predetermined authentication criteria, and a means for developing a user authentication signal when the one or more attributes of the first state vector observations satisfy the predetermined authentication criteria. While the client may be a remote computer system user and the host a central computer system that the remote user seeks to access, the authentication system is applicable to many other situations where a client device seeks to establish authenticity for itself or a message it is sending.

As such, the present invention provides a novel and improved method and apparatus for authenticating the location of a remote client user of networked computing systems by requiring the remote client to provide a location signature obtained from live capture of dynamically changing rebroadcast signals that are controlled by a host rerouting server.

In addition, embodiments of the present invention provide a device at a host system that performs centralized digital signal processing on information provided by rebroadcast units in order to perform location determinations for initial location registration and to perform subsequent authentications of remote users, with or without knowledge of the satellite codes. Embodiments also provide a method for labeling electronic messages with location signature information developed by signals from rebroadcast units for authentication of the message by a subsequent recipient.

An embodiment of the present invention can be utilized in highly scalable architectures called Data Center Security Services (DCSS), which enables organizations to add location and proximity verification to a multi-factor trust chain. As mentioned previously, DCSS enables organizations to add location and proximity verification to a multi-factor trust chain, strengthening and simplifying security from any protocol, system, technology or location. Geo-location, signal triangulation, and IP address lookup have all been used in some fashion to enable location-based policy decisions.

While these technologies continue to have application in areas such as enforcement of access rules to licensed content or low-level system security controls, the limitations and vulnerabilities in these technologies make them a less than ideal choice in protecting areas such as data centers, critical infrastructure and other highly sensitive information and services. However, these location technologies have serious limitations, such as: being subject to spoofing, limited ability to operate within buildings, and a high degree of error.

Embodiments of the present invention address the challenges of location verification via the use of Contextual Location Fingerprint (CLF), which uses electronic sensors to establish contextual information about a location, e.g. a room within a building. This contextual information is then used to establish a digital fingerprint for that location which generally is unrelated to the geo-characteristics of that location.

Much like a human fingerprint, embodiments of the present invention compares measurements taken at different time intervals to confirm the measurements were taken from the same location. Unlike the aforementioned location technologies with limitations, embodiments of the present invention are: not subject to practical spoofing attempts, have a very high degree of accuracy, and are not based in any way on geo-location. If an attacker gains access to the raw data constituting a CLF fingerprint, the attacker is not be able to infer anything about the location being secured. Thus, embodiments of the present invention are an excellent solution for government, military and commercial enterprises needing robust location authentication.

As mentioned previously, the launch, execution and later movement of workloads from cloud servers as a function of the government or corporate policies may need to be restricted based on the servers' pool geolocation. A common practice is to only use cloud servers that are physically located within the same trusted pool and the same country, taking advantage of the trusted pools of compute and, if possible, the same data center.

Determining the approximate physical location of an object, such as a cloud computing server, is generally known as geolocation. Verification of a data center's geolocation can be accomplished in many ways, with varying degrees of accuracy, security and cost. For example, a cloud can be created that meets specific security requirements inclusive of location as a factor and access to that cloud can be controlled so that only the right applications get deployed to the right designated pool of servers within the approved locations. In addition, an ability to perform regular audits through a secure physical presence verification mechanism can be used.

Technology known as Location Specific Digital Fingerprint (LSDF), as described in U.S. Pat. No. 7,177,426 to Dube, which is incorporated herein by reference, can be used to aggregate trusted systems and segregate them from untrusted resources based on physical location. Embodiments of the present invention provide a comprehensive framework for elevating the trust of Data Center Location Security (DCLS).

Prior to the assurance that the claimed geolocation of the cloud servers is accurate, having the basic assurance of trustworthiness of the compute pool is essential. Once such attestation is established, the safe hypervisor launch and secure migration of workloads amongst homogenous trusted server platforms follows and, in conjunction with the location, the desired security is achieved. To achieve such a goal, the following four stages are established: 1) Platform Attestation via hardware root of trust, 2) Safer Hypervisor Launch, which ensures cloud workloads are run on trusted server platforms, 3) Trust-Based Homogeneous Secure Migration, which allows cloud workloads to be migrated among homogeneous trusted server platforms within a cloud, and 4) Trust location, which allows cloud workloads to be migrated among homogeneous trusted server platforms within a cloud, taking into consideration the geolocation restrictions imposed by the policies.

For example, FIG. 1 is an illustration showing a Data Center Security Services (DCSS) master solution system 100, in accordance with an embodiment of the present invention. The exemplary DCSS master solution system 100 includes three primary components: the client 102, the location hub 104, and the Master Authentication Session Servers (MASS) 106. The client 102 is the user or machine seeking to verify the location of a server 106 before attempting to use it. The location hub 104 is server and receiver components that collect telemetry in order to prove the client is at the location claimed. The master authentication session servers (MASS) 106 service authentication challenges and responses for multiple Location Hubs 104. The MASS 106 establishes a shared secret between a location and a client 102.

Figure 2:
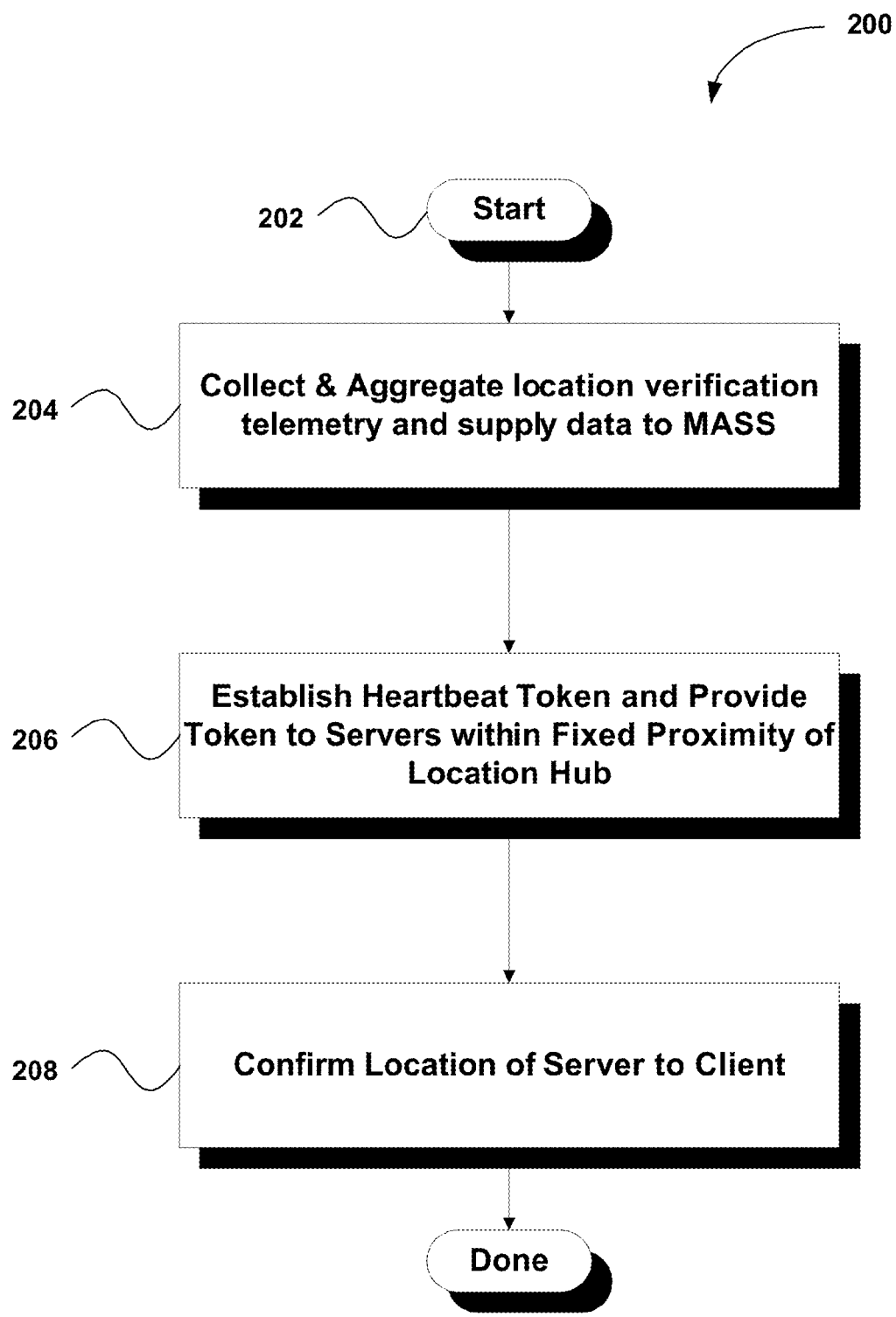
FIG. 2 is a flowchart showing a method for DCSS authentication, in accordance with an embodiment of the present invention.

FIG. 2 is a flowchart showing a method 200 for DCSS authentication, in accordance with an embodiment of the present invention. In an initial operation 202, preprocess operation can be performed. Preprocess operations can include setting up the physical components of the DCSS master solution system, determining which contextual information data will be used for authentication in the system, and other preprocess operation that will be apparent to those skilled in the art with the hindsight provided after a careful reading of the present disclosure.

In operation 204, a Contextual Data Collection Device (CDCD) receiver network is used to locally collect and aggregate location verification telemetry, which is securely supplied to MASS. In one embodiment, this can be an out-of-band process which ensures a relevant location verification heartbeat.

As described previously, CDCDs are different types of devices and contextual information which can be collected from a location. One example of a CDCD is Location Specific Digital Fingerprint (LSDF) data. LSDF employs a special type of RF measurement to create a 3-D model for a location. LSDF receivers remain in place after the initial characterization of a location in order to answer location challenge requests sent to machine(s) at that location. As with other CDCD devices, LSDF data contains no hint of the location's geo coordinates.

Figure 3:
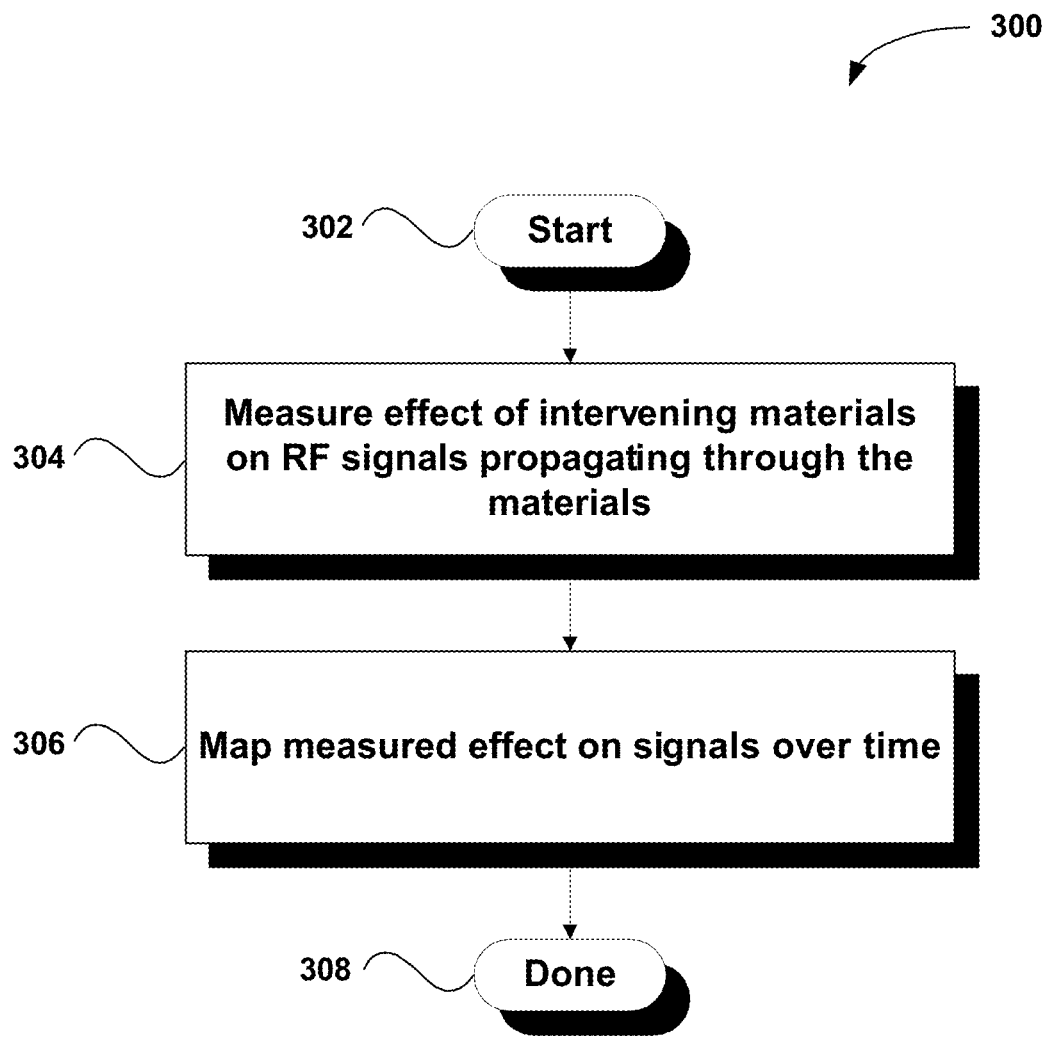
FIG. 3 is a flowchart showing a method for characterizing a specific space for authentication purposes, in accordance with an embodiment of the present invention.

For example, FIG. 3 is a flowchart showing a method 300 for characterizing a specific space for authentication purposes using LSDF methods, in accordance with an embodiment of the present invention. In an initial operation 302, preprocess operations are performed. Preprocess operations can include, for example, determining the size of the specific space to be characterized, determining the amount of characterization data to be used, and other preprocess operations that will be apparent to those skilled in the art with the hindsight acquired after a careful reading of the present disclosure.

In operation 304 the effect the intervening materials surrounding the specific space have on RF signals propagating through the materials is measured. There are a number of methods that can be utilized to measure the effect intervening material has on RF signals propagating through the material. For example, in one method, highly precise dual frequency measurements of the dielectric content of the material are performed to measure the total electron content (TEC) of the materials by observing the effect on the dual frequency signals. In another method, the attenuation of single frequency signals due to loss by scattering is measured. Both techniques produce a unique location signature by accumulating TEC or signal strength data from radio wave-emitting satellites in orbit, such as GPS satellites. The specific choice of dual frequency TEC measurements vs. single frequency attenuation measurements can be dictated by environment, application requirements or cost, but both approaches produce unique location signature maps that will largely look the same.

Typically, several GPS satellites are within the line of sight of any place on Earth at any time. Furthermore, different satellites send signals from different directions into a room at any given moment and these directions all change as the satellites orbit. Therefore, over a period of hours, the variations in the intensities of signals from many directions can be detected and recorded, as discussed next with respect to operation 306.

The measured effect of the intervening materials on RF signals is mapped over time to create a location signature based on the measured effect of the intervening material surrounding the specific space, in operation 306. As mentioned above, over a period of hours, the variations in the intensities of signals from many directions can be detected and mapped. These variations in intensity with direction in the room can then be stored as a location signature to be compared with shorter-period signatures sent from the same location by someone requesting secure communications.

Figure 4:
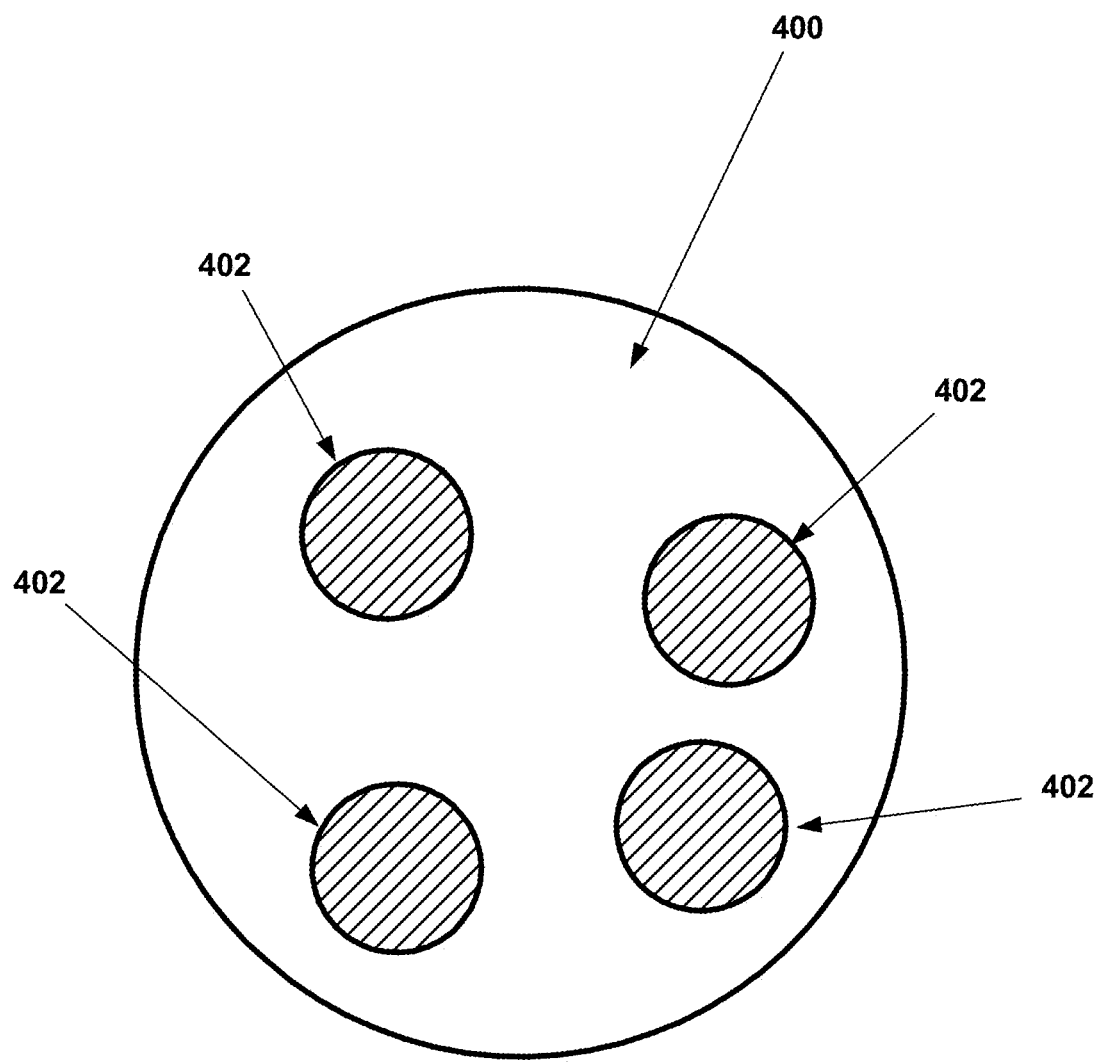
FIG. 4 is a conceptual diagram illustrating a location signature, in accordance with an embodiment of the present invention.

FIG. 4 is a conceptual diagram illustrating a location signature 400, in accordance with an embodiment of the present invention. In the example of FIG. 4, the location signature 400 represents the data space of values based on the measured effect of the intervening materials surrounding the specific space on RF signals mapped over time. Each RF measurement data 402 represents a smaller amount of data based on the measured effect of the intervening materials on RF signals collected over a much shorter period of time. For example, the location signature 400 can represent data collected at a receiver over a twenty-four hour period of time, while each RF measurement data 402 represents, for example, several minutes of data collected at the receiver.

Turning back to FIG. 3, post process operations are performed in operation 308. Post process operations can include, for example, storing the location signature for the specific space in a database, mapping additional specific spaces, and other post process operations that will be apparent to those skilled in the art with the hindsight acquired after a careful reading of the present disclosure.

Figure 5:
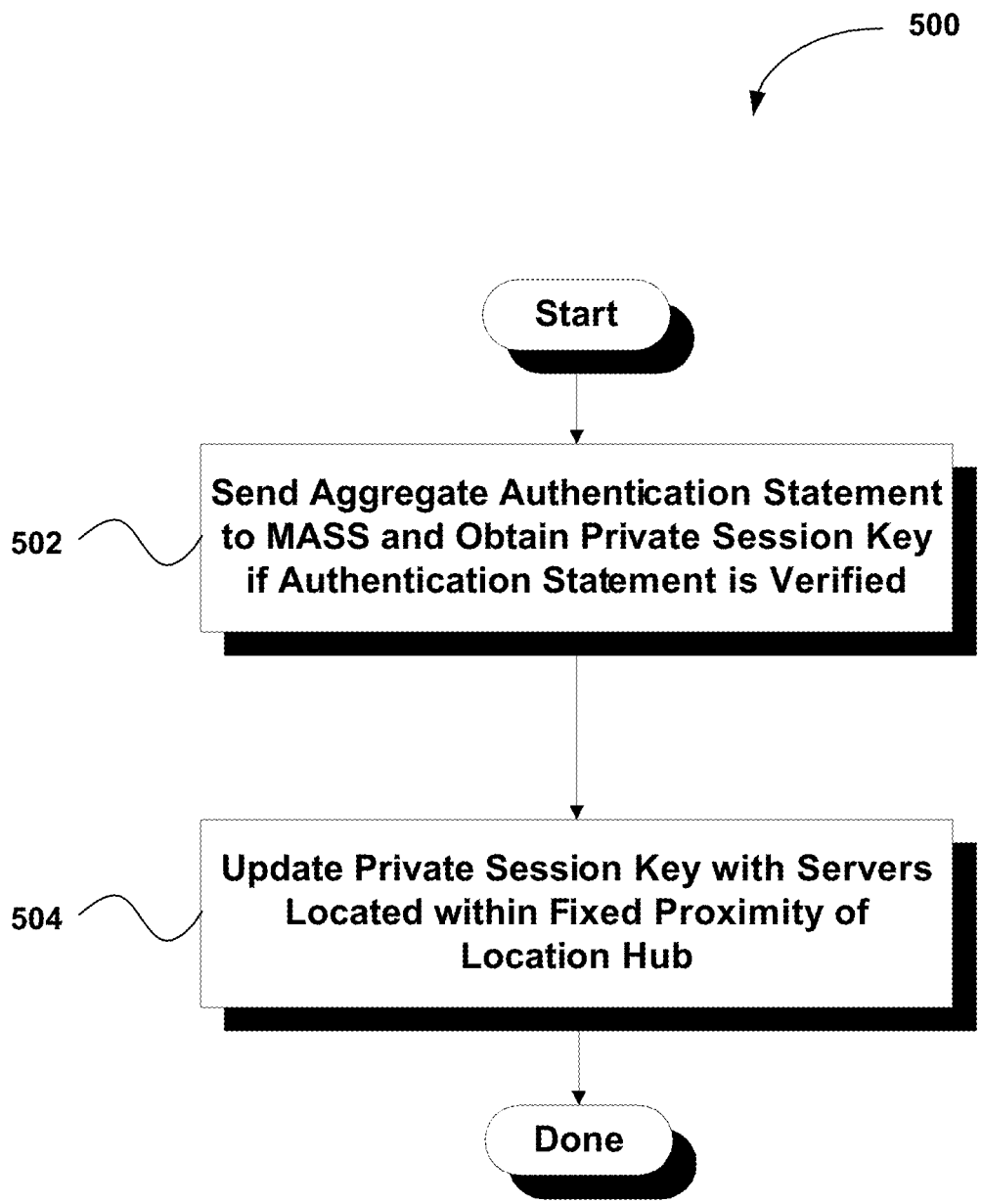
FIG. 5 is a flowchart showing a method for establishing a heartbeat token and providing it to servers within a fixed proximity of the location hub, in accordance with an embodiment of the present invention.

Referring back to FIG. 2, in operation 206, a heartbeat token is established and provided to servers within a fixed proximity of the Location Hub 104. This is accomplished through a two-step process, as described next with reference to FIG. 5. FIG. 5 is a flowchart showing a method 500 for establishing a heartbeat token and providing it to servers within a fixed proximity of the location hub, in accordance with an embodiment of the present invention.

In operation 502, an aggregated authentication statement is sent to the MASS and a new private session key is obtained if the aggregated authentication statement is verified. More specifically, at regular intervals, for example every 10 minutes, the Location Hub 104 sends an aggregated authentication statement to the MASS 106. The authentication statement indicates the identity of the location hub 104 and provides data to prove that identity. For example, a location hub having an identity of "#1" could provide an authentication statement that indicates it is Location Hub #1 and includes data to prove that identity. The MASS 106 uses the supplied data to verify that the Hub authentication statement is accurate.

If successfully verified, the MASS 106 updates its local database with a new short-term public session key and supplies a private session key to the Location Hub 104. If verification fails, the current public session key is removed from a MASS 106 Session Key Table. The MASS 106 maintains a database of information for multiple locations 104, not just Location #1. In one embodiment, session keys expire from the MASS 106 at intervals determined by the user's defined policy and/or whether new location verification statements are received from the Location Hub 104.

In operation 504, the private session key is updated with servers located within a fixed proximity of the Location Hub. Specifically, the Location Hub 104, upon receiving the new private session key, updates the private session keys with the servers located within a fixed proximity of the Location Hub 104.

This can accomplished through an RFID broadcast to servers containing the appropriately configured RFID receivers. The private session keys are then stored within an environment, such as Intel's PSS environment, so that private session keys can be accessed by the server in a READ-ONLY fashion.

Referring back to FIG. 2, the location of a server having resources requested by a client is confirmed to the client. The client 102 first requests the session information from the MASS 106 environment by requesting a public session key for a particular location hub 104. For example, the client can request a public session key for Location #1. The client 102 then encrypts their payload with that public session key and sends the encrypted payload to a server which should be operating at Location #1. That server is only able to accept and decrypt the payload if its own session information was updated in the environment as part of operation 206.

This protocol can itself be chained. By allowing the MASS 106 environments to become location-confirmed assets, multiple MASS 106 environments can be chained together so that the client 102 does not need to directly know or access the MASS 106 environment used by Location #1. A chained environment can be balanced with the TTL of session keys in order to manage the amount of authentication chatter which would result from such a configuration.

As previously noted, the need for verification of the physical location of servers in targeted data centers remains a major challenge for regulated classes of data and services. While solutions using GPS have been proven to be spoofable, the concept of location-specific fingerprinting LSDF using embedded RFID solutions addresses both security planning and information security.

In this manner, embodiments of the present invention provide organizations with numerous potential applications and expanded capabilities. This versatility allows the company to mitigate risk and strengthen security while maximizing their investment.

Because RFID capabilities are embedded inside many motherboards, many end-user appliances are able to collect LSDF telemetry in an out-of-band fashion and in a way that is hidden from the end user. Through appropriate network or application policy configurations, an end user won't even be aware of the location authentication taking part on their behalf When a user is in an approved location and can satisfy other appropriate forms of authentication, they will be able to access the protected resource. When a user leaves the approved location, either their access to the resource will be terminated or their device will cease to function.

Embodiments of the present invention can be utilized to lock a device so it can only be used in approved locations. If a device were turned on in an unapproved location, policy controls would dictate what happens to the device, e.g. hardware failure after n attempts or a simple message stating that the device is locked until accessed from an approved location. Serving as an excellent theft deterrent, this usage model has applicability at both an enterprise level as well as in technology manufacturing & distribution environments.

Phishing can be defined as a broad or targeted attempt to fool a person into sending sensitive information to a rogue environment by making the user feel as though they were communicating with a trusted environment. A permutation of the protocol discussed in this white paper could enable a suite of technologies for application engineers to prevent applications from communicating with unverified machines. While end users generally don't know how to verify trust chains, these controls could become part of a "pre-authentication check" the application performs on behalf of the user before entering his or her own authentication information.

Embodiments of the present invention also provide protection by enabling a re-imaging of "untrusted" environments from trusted locations. In such a model, untrusted machines have their environments re-imaged from BIOS and OS images which only exist in environments protected by the embodiments of the present invention. Therefore, the life of a compromised machine would be defined by policy. If policy dictated nightly refreshes, an infected machine wouldn't be around longer than one day.

Binding both in-bound and out-bound network traffic to trusted sources allows a new dimension in network policy definition and enforcement. Untrusted servers and traffic from unverified locations can have explicit throttling and access controls defined by default, while trusted servers can be governed by more explicit policy configurations. The technology can be further integrated with other commercial offerings to allow for policy configurations at lower layers of the OSI stack.

When embedded in client devices such as tablets, phones, and computers, embodiments of the present invention enable further auditing of a user's actions by associating location, time and a user's identity to their actions. Embodiments of the present invention make internal attacks harder to execute and provides security auditors with a greater level of detail about who did what, where they did it from and when they did it.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing system security and access based on multi-dimensional location characteristics, comprising:
    collecting contextual information characterizing a specific location during a first time period utilizing a contextual data collection device (CDCD), wherein the contextual information indicates specific characteristics of the location and is collected at the location, and wherein the contextual information includes range information from a single perspective to at least two key materials located at the specific location, and wherein the contextual information further includes measured effect data acquired using dual frequency measurements of dielectric content of intervening material, wherein the measured effect data is a measured effect of the intervening materials on radio frequency (RF) signals received at the CDCD from a remote RF source;
    creating a contextual location fingerprint (CLF) based on the collected contextual information, wherein the CLF is a data space of values mapped over specific period of time;
    collecting new contextual information at a location occupied by a device to be verified during a second time period, wherein the new contextual information includes range information from the single perspective to at least two of the key materials located at the specific location; and
    comparing the new contextual information to the CLF and authenticating the device when the new contextual information is within predefined parameters of the CLF.

2. A method as recited in claim 1, wherein the contextual information is mapped over time to create the contextual location fingerprint (CLF).

3. A method as recited in claim 1, further comprising the operation of establishing a token, wherein the token is a private session key.

4. A method as recited in claim 3, wherein the token is provided to other servers within a predefined proximity of a location hub server.

5. A method as recited in claim 1, wherein a key material is a door.

6. A method as recited in claim 1, wherein a key material is a wall.

7. A system for providing system security and access based on multi-dimensional location characteristics, comprising:
    a contextual data collection device (CDCD) that collects contextual information characterizing a specific location during a first time period utilizing, wherein the contextual information indicates specific characteristics of the location and is collected at the location, and wherein the contextual information includes range information from a single perspective to at least two key materials located at the specific location, and wherein the contextual information further includes measured effect data acquired using dual frequency measurements of dielectric content of intervening material, wherein the measured effect data is a measured effect of the intervening materials on radio frequency (RF) signals received at the CDCD from a remote RF source;
    a device that creates a contextual location fingerprint (CLF) based on the collected contextual information, wherein the CLF is a data space of values mapped over specific period of time; and
    a device that compares new contextual information to the CLF and authenticates a device to be verified when the new contextual information is within predefined parameters of the CLF, wherein the new contextual information is collected at a location occupied by a device to be verified during a second time period, and wherein the new contextual information includes range information from the single perspective to at least two of the key materials located at the specific location.

8. A system as recited in claim 7, wherein the contextual information is mapped over time to create the contextual location fingerprint (CLF).

9. A system as recited in claim 7, wherein a token is established, the token being a private session key.

10. A system as recited in claim 9, wherein the token is provided to other servers within a predefined proximity of a location hub server.

11. A system as recited in claim 7, wherein a key material is a door.

12. A system as recited in claim 7, wherein a key material is a wall.

* * * * *